United States Patent
Nevinsky et al.

(10) Patent No.: US 12,226,932 B2
(45) Date of Patent: Feb. 18, 2025

(54) TOOL COMPRISING EUTECTIC MATERIAL, METHOD OF MAKING THE TOOL AND METHOD OF USING THE TOOL

(71) Applicant: The Boeing Company, Chicago, IL (US)

(72) Inventors: Michael D. Nevinsky, Media, PA (US); David Thomas Misciagna, West Chester, PA (US); Michael Vincent D'Olio, Philadelphia, PA (US); Christopher Jay Felker, Downingtown, PA (US)

(73) Assignee: THE BOEING COMPANY, Arlington, VA (US)

( * ) Notice: Subject to any disclaimer, the term of this patent is extended or adjusted under 35 U.S.C. 154(b) by 0 days.

(21) Appl. No.: 18/063,051

(22) Filed: Dec. 7, 2022

(65) Prior Publication Data
US 2024/0190044 A1    Jun. 13, 2024

(51) Int. Cl.
| B28B 7/34 | (2006.01) |
| B22D 23/00 | (2006.01) |
| B28B 7/28 | (2006.01) |
| B33Y 10/00 | (2015.01) |
| B33Y 70/00 | (2020.01) |
| B33Y 80/00 | (2015.01) |

(52) U.S. Cl.
CPC ............ *B28B 7/346* (2013.01); *B22D 23/003* (2013.01); *B28B 7/28* (2013.01); *B33Y 10/00* (2014.12); *B33Y 70/00* (2014.12); *B33Y 80/00* (2014.12)

(58) Field of Classification Search
None
See application file for complete search history.

(56) References Cited

U.S. PATENT DOCUMENTS

| 4,927,712 A | | 5/1990 | Lhymn et al. |
| 5,344,515 A | * | 9/1994 | Chenock, Jr. ......... F04D 29/026 156/173 |

(Continued)

OTHER PUBLICATIONS

Extended European Search Report issued Apr. 24, 2024 in corresponding EP Application No. 23213276.1, 14 pages.

(Continued)

*Primary Examiner* — Mohammad M Ameen
(74) *Attorney, Agent, or Firm* — MH2 Technology Law Group LLP (57) ABSTRACT

A molding tool and method for making the molding tool by additive manufacturing is provided. The molding tool includes a tool body having a tooling surface for molding a part, the tool body comprising a eutectic alloy. The method for making the molding tool by additive manufacturing includes forming a first layer of eutectic alloy, the forming comprising depositing the eutectic alloy in liquid form and then cooling for form a solid eutectic alloy; forming an additional layer of the eutectic alloy on the first layer, the forming of the additional layer comprising depositing the eutectic alloy in liquid form and then cooling to form the solid eutectic alloy; and repeating forming an additional layer of the eutectic alloy on the first layer, the forming of the additional layer comprising depositing the eutectic alloy in liquid form and then cooling to form the solid eutectic alloy, and repeating one or more times to form a structure comprising a tool body having a tooling surface.

27 Claims, 4 Drawing Sheets

(56) References Cited

U.S. PATENT DOCUMENTS

| | | |
|---|---|---|
| 8,834,668 B2 | 9/2014 | Nelson et al. |
| 11,065,828 B2 | 7/2021 | Roberts |
| 2004/0216856 A1 | 11/2004 | Pacchiana et al. |
| 2013/0101406 A1* | 4/2013 | Kweder ............. B29D 99/0028 428/113 |
| 2016/0121555 A1* | 5/2016 | Kunc .................... B29C 33/448 264/219 |
| 2020/0103857 A1 | 4/2020 | Wynne et al. |
| 2021/0008765 A1 | 1/2021 | Connell |
| 2021/0349439 A1 | 11/2021 | Osgood et al. |
| 2022/0134672 A1 | 5/2022 | Matusik et al. |

OTHER PUBLICATIONS

Extended European Search Report issued May 3, 2024 in related EP Application 23213282.9, 6 pages.

* cited by examiner

TOOL COMPRISING EUTECTIC MATERIAL, METHOD OF MAKING THE TOOL AND METHOD OF USING THE TOOL

FIELD OF THE DISCLOSURE

The present disclosure is directed to a molding tool comprising a eutectic alloy. A method of making the molding tool and a method of making a composite part using the molding tool are also disclosed.

BACKGROUND

Composites, such as ceramic matrix composite (CMC) materials, are generally well known and comprise reinforcing fibers in a ceramic matrix. In certain CMC materials both the reinforcing fibers and matrix can be ceramic materials. These materials can be used in many applications, including, for example, as an alternative to metallic structures in high temperature applications such as engine exhaust ducts and in heatshield applications where temperatures can reach, for example, 300° F. to 2000° F. Techniques for making composite materials can include laying up a wet composite material on a molding tool that has the desired shape and then drying or preliminary curing the composite to form a green body. The initial drying or preliminary curing step to form the green body is followed by a sintering or final curing phase, before ultimately removing the composite part from the molding tool. Alternatively, it can be desirable to remove the molding tool before the final sintering step to avoid coefficient of thermal expansion (CTE) mismatch problems between the molding tool and the composite surface at high temperatures. Thermal mismatch problems can distort the final shape of the composite (e.g., CMC) part.

Part complexity can lead to the molding tool being trapped by the green body if geometric contours of the part being made close in on the tool. Such trapped tools can be difficult if not impossible to remove, especially before sintering because the green body can be relatively fragile. There are some existing solutions for removing otherwise trapped tools, but they are costly, are not environmentally preferred or both.

One known solution is to make the molding tool, also referred to herein as layup tools, from dissolvable materials, such as eutectic salts. Eutectic salts are water soluble, enabling removal from complex parts. However, eutectic salts also have several properties that make them difficult to work with, such as high processing temperatures (e.g., casting done at high temperature ~500° F.), high densities, corrosive waste streams, high shrinkage on solidification (~20%), and slow washout times (e.g., days). Further, eutectic salts can be costly and require water to wash out the tool material from a CMC material that can also be water based, which potentially can cause part erosion before sintering.

Another known solution is to employ break-apart molding tools that can be disassembled after use to allow for removal from the ceramic part. However, break-apart molding tools can be complex due to their being made of multiple pieces, resulting in high costs.

Burnout tools are yet another known solution. These tools are made of a combustible material that can be burned from the tool. However, burnout tools cause thermal mismatch concerns and also present environmental hazards, which are undesirable.

Thus, there is a need in the art for alternative materials and processes that can provide for easily removable tools during the manufacturing of composite parts.

SUMMARY

In accordance with the present disclosure, a molding tool comprising a tool body having a tooling surface for molding a part, the tool body comprising a eutectic metal is provided.

In accordance with the present disclosure, a method of making a molding tool by additive manufacturing is provided. The method comprises forming a first layer of eutectic alloy, the forming comprising depositing the eutectic alloy in liquid form and then cooling to form a solid eutectic alloy; forming an additional layer of the eutectic alloy on the first layer, the forming of the additional layer comprising depositing the eutectic material in liquid form and then cooling to form a solid eutectic alloy and repeating one or more times to form a structure comprising the molding tool having a tooling surface, the molding tool comprising the eutectic alloy.

In accordance with the present disclosure, another method of making a composite part is provided. The method comprises laying up a moldable composite material on a tool, the tool comprising a eutectic alloy having a melting temperature, heating the moldable composite material to a first temperature that is below the melting temperature of the eutectic cooling to form a solid eutectic alloy to form a green body, heating the green body to a second temperature to form a composite part, the second temperature being above the melting temperature of the eutectic alloy so as to melt the molding tool to form a liquid tool alloy, and removing at least a portion of the liquid molding tool material from the composite part.

In accordance with the present disclosure, a composite part comprising a ceramic material is provided. The composite part has an inner surface and an outer surface, the inner surface having at least trace amounts of a eutectic alloy disposed thereon.

It is to be understood that both the foregoing general description and the following detailed description are exemplary and explanatory only and are not restrictive of the present teachings, as claimed.

BRIEF DESCRIPTION OF THE DRAWINGS

The accompanying drawings, which are incorporated in and constitute a part of this specification, illustrates aspects of the present teachings and together with the description, serve to explain the principles of the present teachings.

It should be noted that some details of the figures have been simplified and are drawn to facilitate understanding rather than to maintain strict structural accuracy, detail, and scale.

DETAILED DESCRIPTION

Reference will now be made in detail to the present teachings, examples of which are illustrated in the accompanying drawings. In the drawings, like reference numerals have been used throughout to designate identical elements. In the following description, reference is made to the accompanying drawings that form a part thereof, and in which is shown by way of illustration specific examples of practicing the present teachings. The following description is, therefore, merely exemplary.

The present disclosure is directed to molding tools and methods of making molding tools. The molding tools can be employed to mold CMC and other composite materials to form composite parts. The molding tools are made using eutectic alloys that are selected to have a eutectic point that allow the molding tool to stay solid during an initial heating process, also referred to herein as a preliminarily cure, to form a green body CMC, but become liquid above the sintering temperature of the CMC. The initial heating process dries the composite material sufficiently to allow the green body part to maintain a desired shape. The molding tool is then melted during a subsequent high temperature heating step used to sinter the composite materials of the molded composite part. The sintering step is also referred to herein as a final curing step. Once all or part of the molding tool formed of the eutectic alloy has melted, the composite part can easily be removed.

The eutectic molding tools and methods of the present disclosure can address both thermal mismatch and trapped tool issues. Additionally, the molding tools can be made by additive manufacturing techniques. Additive manufacturing the molding tool allows for complex molding tool shapes and enables a wider design space for tooling.

Molding Tool

Figure 1:
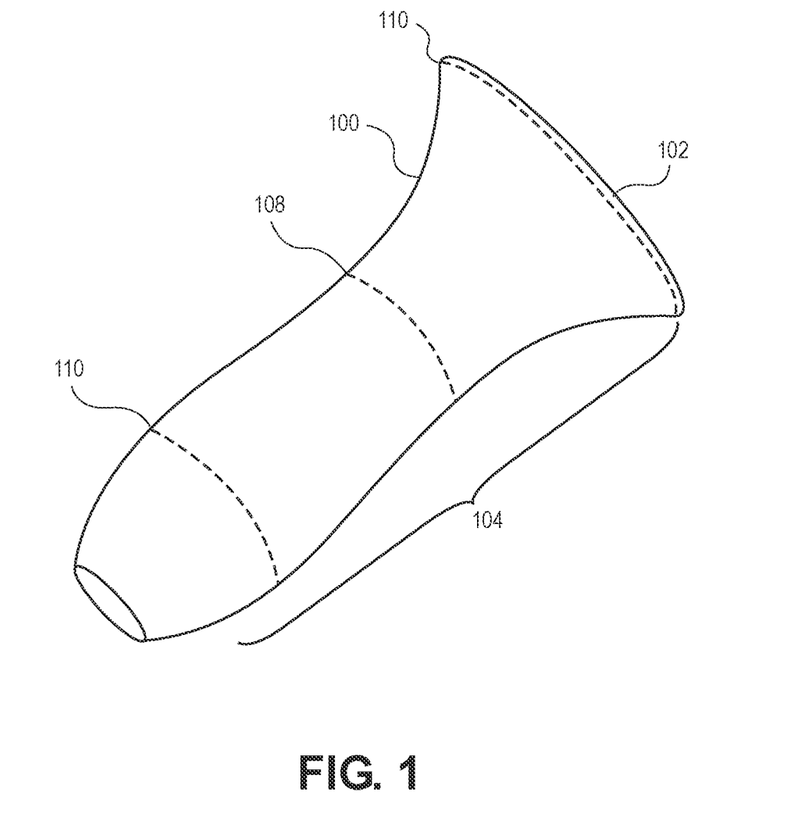
FIG. 1 illustrates a schematic view of a molding tool, according to an example of the present disclosure.
Figure 2:
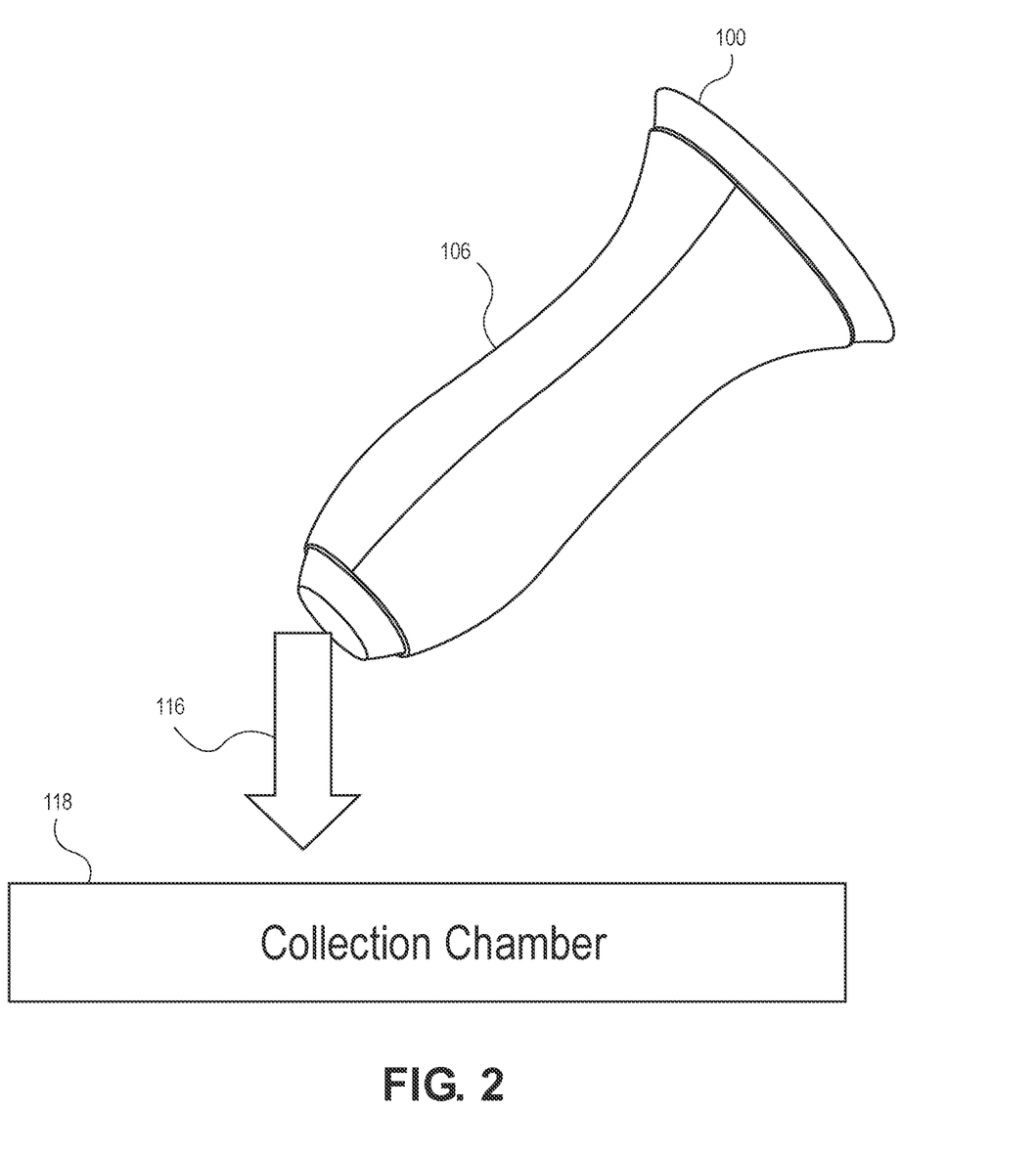
FIG. 2 illustrates a schematic view of a molding tool and a part being shaped thereon, according to an example of the present disclosure.

FIG. 1 illustrates a molding tool 100, such as a layup mandrel or any other type of molding tool suitable for shaping composites. The molding tool comprises a tool body 102 having a tooling surface 104. Tooling surface 104 is used for fabricating a part 106, as illustrated in FIG. 2. Molding tool 100 comprises a eutectic alloy of two or more metals. In an example, molding tool 100 is comprised entirely of, or substantially entirely of, the eutectic material.

The tooling surface 104 can have a shape, that can be a three-dimensional if desired, of a composite part being formed. In certain aspects, complexity of the shape of tooling surface 104 prevents removal of tool body 102 from part 106, where part 106 does not enclose at least one side of tool body 102 so that it could otherwise be removed. For example, tooling surface 104 can have a complex shape, such as, a fluted shape and/or a concave shape that is capable of trapping part 106 on the molding tool 100. In an implementation, as shown in FIG. 1, the tooling surface 104 can comprise a smaller perimeter portion (illustrated by dashed line 108) disposed between two larger perimeter portions (illustrated by dashed lines 110). While the molding tool 100 is shown with a specific shape in FIGS. 1 and 2, it is to be understood that the molding tool 100 can have many different shapes depending on the desired shape of part 106.

The eutectic alloy employed will depend on the temperatures used to manufacture part 106. Any suitable eutectic alloy can be employed. Examples of suitable eutectic alloys include, but are not limited to, tin/zinc alloys, tin-lead alloys, tin-silver alloys, tin-lead-silver alloys, tin-copper-nickel-germanium alloys, bismuth-lead-indium-tin-cadmium alloys, indium-bismuth-tin alloys, bismuth-tin alloys, and combinations thereof. The suitable eutectic alloy will have a eutectic point above the preliminary cure temperature that forms a CMC green body, but below the sintering temperature of the CMC.

A eutectic point is generally defined as the lowest possible melting temperature over all of the mixing ratios for the involved component species of a eutectic alloy. The eutectic alloy employed can be chosen to have a melting temperature that is at, or substantially at, the eutectic point of the eutectic alloy, such as within about 1° F. or 2° F. of the eutectic point. In addition, the eutectic alloy is selected to be able to withstand an initial heat treatment used to dry the molding material. The initial heat treatment preliminarily cures the molding material into a green body, prior to sintering or final curing at higher temperatures than are used in the initial heat treatment. For example, where the initial heat treatment or preliminary cure is to be performed at temperatures of about 370° F. or below, a eutectic alloy comprising tin/zinc alloys, which have a melting point of about 390° F., can be employed. The eutectic alloy is also chosen to have a melting point below the higher temperatures of the sintering or final curing, so that during the sintering the molding tool is melted to a liquid form. This allows for easy removal of the molding tool from the part, which may have a complex shape and be otherwise difficult to remove from a molding tool when the molding tool is not formed of a eutectic alloy. As a result, the disclosed eutectic salts avoid the problems associated with use of eutectic salts including high processing temperatures such as casting done at ~500° F., high densities, corrosive waste streams, high shrinkage on solidification (~20%), and washout times of days.

Because molding tool 100 is not required to be disassembled for removal from part 106, molding tool 100 can optionally be a one-piece tool, meaning that the tool comprises only a single, unitary part. One-piece tools can be simpler and more cost effective to manufacture than multi-piece tools. Nevertheless, molding tool 100 can comprise more than a single piece if desired.

Method of Making the Molding Tool

The present disclosure is also directed to a method of making a molding tool by additive manufacturing. As shown at 130 of FIG. 3, the method comprises forming a first layer of eutectic alloy, where the forming of the first layer comprises depositing the eutectic alloy in liquid form and then rapidly cooling to form a solid eutectic alloy. The rapid cooling, also referred to herein as flash freezing, solidifies the liquid eutectic alloy into a solid eutectic alloy that retains the eutectic alloy composition and properties. As shown at 132, the method further comprises forming an additional layer of the eutectic alloy on the first layer. The forming of the additional layer also comprising depositing the eutectic alloy in liquid form and rapidly cooling to form the solid eutectic alloy. As shown at 134, the process at 132 of forming an additional layer is repeated one or more times to form a structure comprising a tool body having a tooling surface. As described herein, the eutectic alloy can be a metal alloy comprising at least two metals. In an example, the method can further comprise machining the tooling surface 104 to provide the desired smoothness and/or other texture desired for molding of part 106.

Figure 3:
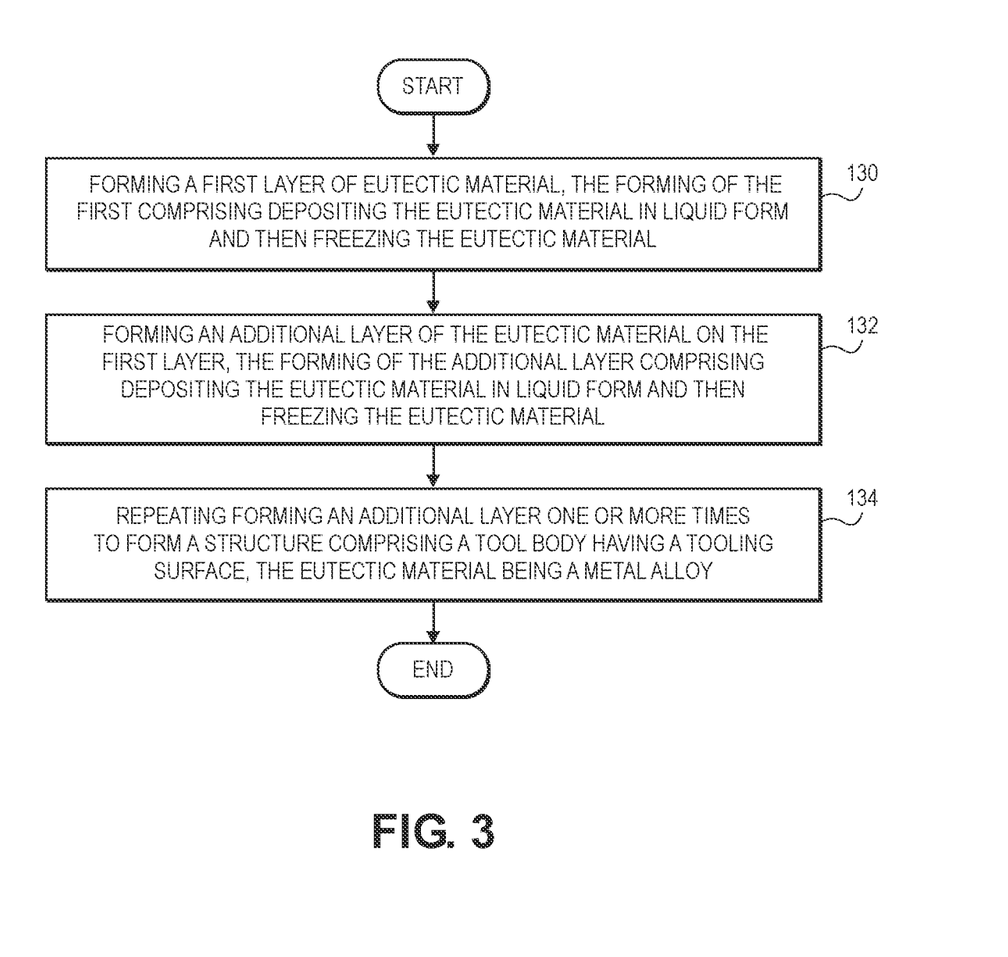
FIG. 3 illustrates a method of making a molding tool by additive manufacturing, according to an example of the present disclosure.

In an implementation, a drawn wire solder process can be employed as the additive manufacturing process. In such a process, the depositing of the eutectic alloy to form the first layer and additional layers includes supplying a wire feed comprising the eutectic alloy, heating to melt the eutectic alloy to a suitable viscosity for deposition, and depositing the melted eutectic alloy to form the layer being built. The melted eutectic alloy that is deposited rapidly cools to form a solid eutectic alloy. Other suitable additive manufacturing techniques can also be employed, including but not limited to fused deposition modelling ("FDM"). Any of the eutectic alloys described herein can be employed in the additive manufacturing processes to make molding tool 100.

Heating a eutectic alloy can cause the two or more metal components of the eutectic alloy to separate if temperature limits are exceeded. The temperature limits will depend on the type of eutectic alloy being employed. During heating, the eutectic alloy can be maintained within a desired temperature range that is generally near the eutectic point of the alloy (e.g., within plus 5° F., or plus 10° F., of the eutectic point, although the range will vary depending on the alloy) to avoid separation of the eutectic alloy into its metal components. For example, for a tin/zinc alloy having a eutectic point of about 390° F., the temperature of the eutectic during deposition can be maintained so as not to be more than 395° F. to 400° F.

In the additive manufacturing process of the present disclosure, the solidification process is carried out on the eutectic alloy to cool and solidify the material before the metal components of the eutectic alloy can separate. Separation of the metal components impairs the desired eutectic properties. Rapid cooling, for example by flash freezing, to solidify the eutectic alloy can maintain the eutectic properties of the additively manufactured tool by preventing such separation of the metals of the eutectic alloys (e.g., zinc and tin).

As an example, the rapid cooling can comprise flowing an inert gas into contact with the liquid eutectic alloy until the temperature of the eutectic alloy is reduced to below the solidification point of the eutectic alloy. Any suitable inert gas can be employed, such as argon or nitrogen. The temperature of the inert gas can be selected to provide the desired cooling rate of the eutectic after deposition. For example, the temperature of the cooling gas can range from about the eutectic point to about 50° F. below the eutectic point, or lower, for a given material, such as any of the alloy described herein.

The cooling gas can be directed to come into contact with the melted eutectic alloy in any desired manner. For example, the cooling gas can be directed by one or more jets or other gas conduits so as to impinge on the eutectic alloy. In an implementation, the eutectic alloy is contacted with the cooling gas either simultaneously as, or immediately after (e.g., within about 30 seconds, or within about 10 seconds), the liquid eutectic alloy is disposed as part of the layers being formed during the additive manufacturing method. As an example, the cooling gas can impact the liquid material immediately after deposition of the material in a drawn wire solder process.

As described above, the molding tool 100 can be a one-piece tool. Alternatively, the molding tool 100 can be a multi-piece tool. Further, additive manufacturing can allow molding tools of virtually any shape, including complex shapes, to be manufactured. Tools of any shape described herein can be manufactured by the methods of the present disclosure. For example, tools comprising a tooling surface defining a smaller perimeter portion disposed between two larger perimeter portions, such as a flute shape, can be manufactured.

Method of Making the Composite Part

Figure 4:
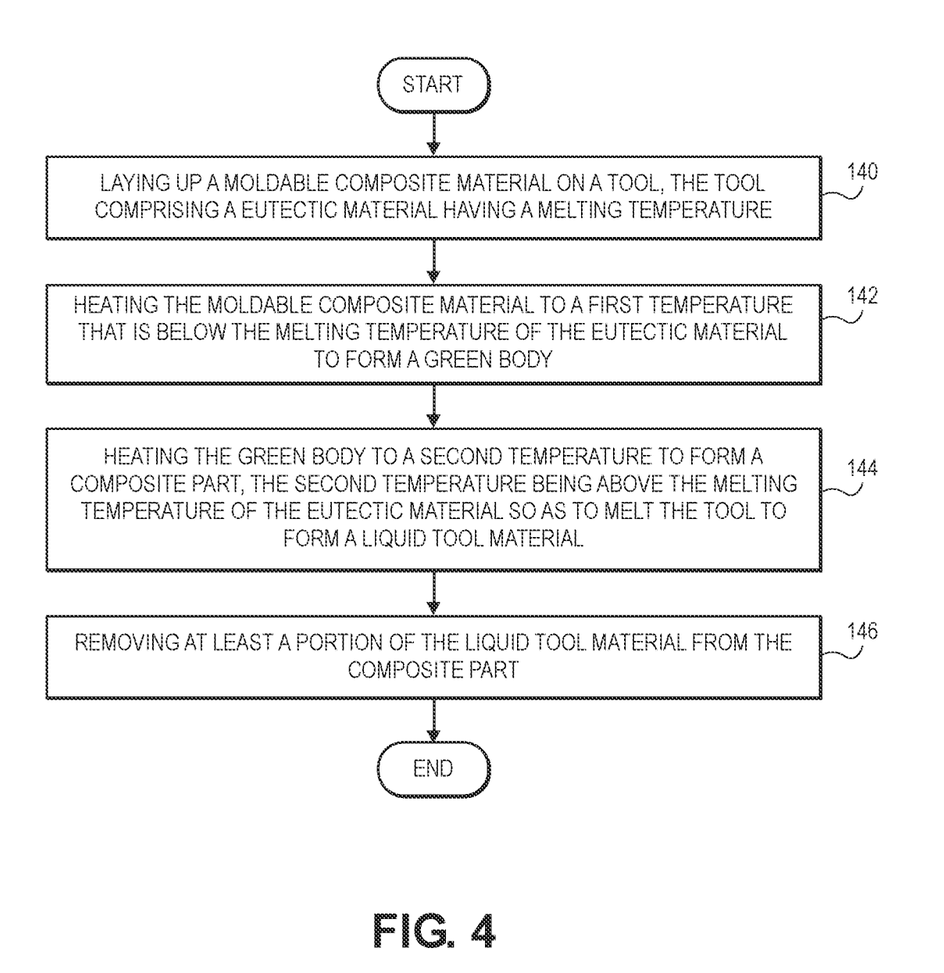
FIG. 4 illustrates a method of making a composite part, according to an example of the present disclosure.

The present disclosure is directed to a method of making a composite part. As shown at 140 of FIG. 4, the method comprises laying up a composite material, such as a ceramic matrix composite, on a molding tool. The molding tool can be any of the moldable tools described herein. The molding tool comprises a eutectic alloy having a melting temperature that is at, or substantially at, the eutectic point of the eutectic alloy. As shown at 142, the moldable composite material is heated to a first temperature that is below the melting temperature (e.g., below the eutectic point) of the eutectic material to form a green body. After heating to the first temperature, the green body is heated to a second temperature to form a composite part, as shown at 144. The second temperature is above the melting temperature of the eutectic alloy so as to melt the molding tool to form a liquid molding tool alloy. The second temperature can be, for example a sintering temperature that coalesces the porous green body and/or removes any remaining moisture. The molding tool can also be melted during the temperature ramp up for the final sintering process. As indicated by the arrow 116 of FIG. 2 and as shown at 146 of FIG. 4, at least a portion of the liquid molding tool alloy can then be removed from the composite part. Removal of the liquid molding tool alloy can occur by any suitable technique, such as by allowing the liquid alloy to drain, under the force of gravity, from an orifice in part 106. Optionally, the melted eutectic alloy can be collected in a collection vessel 118 and recycled to make additional molding tools by the additive manufacturing techniques described herein.

The moldable composite material can comprise any suitable composite material. In an example, the composite material comprises a matrix material and fibers positioned in the matrix material where the fibers comprise ceramics, metals or a combination thereof; and the matrix material comprises ceramics, metals or a combination thereof. In an example, both the fibers and the matrix material comprise a ceramic material. The material chosen for the fibers and the matrix can be the same or different. In an example, the matrix material comprises a liquid component (e.g., carrier liquid or solvent) and a solid component, such as particles comprising a ceramic. In examples, the moldable composite material is chosen from a pre-preg, ceramic matrix composite comprising both ceramic fibers and ceramic matrix; or a metal matrix composite comprising both metal fibers and metal matrix.

The temperature profile of the thermal treatment for drying and sintering the composite can vary depending on the composition of the composite. In an example, the temperature employed during the drying to form the green body will be below the eutectic point of the eutectic material, such as within a range of from about 200° F. to about 500° F., about 250° F. to about 450° F., about 320° F. to about 370° F., or about 350° F. The drying hardens and bonds the composite sufficiently to allow handling of the green body, such as for example, moving the green body from a drying chamber to a furnace for heating to the sintering and/or final curing temperature.

In an example, the second temperature is sufficient to sinter the matrix and/or fibers of the composite. As an example, the second temperature ranges from about 1500° F. to about 3000° F., such as about 1500° F. to about 2500° F., or about 2000° F. In an implementation, the solid component comprises a ceramic and the second temperature is a sintering temperature of the ceramic.

As described herein, the tooling surface of the molding tool has a three-dimensional shape that can prevent removal of the composite part in solid form, such as any of the molding tool shapes described herein. The molding tool can comprise any of the eutectic alloys described herein.

In an implementation, part 106 can be a composite part that includes an inner surface and an outer surface. The inner surface of the composite part retains at least trace amounts of a eutectic alloy that can be detected using, for example, Fourier-transformed infrared (FTIR) spectroscopy. For example, the composite part can comprise a porous material, such as a ceramic, wherein a portion of the eutectic alloy from the melting of the molding tool remains disposed within at least some pores on the inner surface after completion of the final heating (e.g., sintering). The eutectic alloy that remains from the method of making the composite part of the present disclosure is detectable. If a composite part (e.g., a CMC product) made by the methods described herein is tested with Fourier-transformed infrared spectroscopy, the spectrum will show the elements which make up a eutectic alloy system, including any eutectic alloy components that have seeped into the pores of the composite part.

Example

Selection of a metal alloy for a molding tool depends on the cure and sintering temperature of the CMC tool to be fabricated using the molding tool. In an example, a tin-zinc molding tool can be fabricated according to the present disclosure. Zinc has a melting point at about 787° F. and tin has a melting point at about 450° F. Tin and zinc, however, form a eutectic mixture at about 389° F. of about 9 wt % zinc and 91% tin. Because the eutectic point is about 389° F., a tin-zinc molding tool formed of the eutectic tin-zinc alloy can be useful for fabricating oxide-oxide CMC composite parts that generally have a cure temperature around 350° F. and a sintering temperature between 1200 and 2000° F. The tin-zinc eutectic molding tool can be used during the curing of the oxide-oxide CMC part because the cure temperature is below the melting point of the eutectic tin-zinc alloy. Subsequently, during the ramp up to the sintering temperature, the tin-zinc eutectic molding tool can melt. This can be particularly advantageous where the oxide-oxide CMC part includes a three-dimensional shape, such as a fluted shape, that prevents easy removal of oxide-oxide CMC part from the molding tool. By melting the tin-zinc eutectic molding tool during ramp up to the sintering temperature, the molding tool can be removed without damage to the yet to be sintered oxide-oxide CMC part.

Other eutectic alloys that can be used for molding tools to fabricate CMC and metal matrix composite (MMC) parts include, but are not limited to, gold-germanium alloys having a eutectic point at about 673° F., tin-silver alloys having a eutectic point at about 430° F., gold-tin alloys having a eutectic point at about 536° F., tin-lead alloys having a eutectic point at about 361° F., and indium-tin alloys having a eutectic point at about 244° F.

Further, the disclosure comprises examples according to the following clauses:

Clause 1. A molding tool, comprising a tool body having a tooling surface for molding a part, the tool body comprising a eutectic metal alloy.

Clause 2. The molding tool of clause 1, wherein the tooling surface has a three dimensional shape that is capable of preventing removal of a molded composite part that does not enclose at least one side of the tool body.

Clause 3. The molding tool of clause 1 or 2, wherein the tooling surface comprises a fluted shape that is capable of preventing removal of a molded composite part that does not enclose at least one side of the tool body.

Clause 4. The molding tool of any of clauses 1-3, wherein the tooling surface comprises a concave shape that is capable of preventing removal of a molded composite part that does not enclose at least one side of the tool body.

Clause 5. The molding tool of any of clauses 1-4, wherein the tooling surface comprises a smaller perimeter portion disposed between two larger perimeter portions.

Clause 6. The molding tool any of clauses 1-5, wherein the eutectic metal alloy comprises tin/zinc alloys, tin-lead alloys, tin-silver alloys, tin-lead-silver alloys, tin-copper-nickel-germanium alloys, bismuth-lead-indium-tin-cadmium alloys, indium-bismuth-tin alloys, bismuth-tin alloys, or combinations thereof.

Clause 7. The molding tool of any of clauses 1-6, wherein the tool is a one-piece tool.

Clause 8. A method of making a molding tool by additive manufacturing, the method comprising: i) forming a first layer of eutectic material, the forming comprising depositing the eutectic material in liquid form and then freezing the eutectic material; ii) forming an additional layer of the eutectic material on the first layer, the forming of the additional layer comprising depositing the eutectic material in liquid form and then freezing the eutectic material; iii) repeating ii) one or more times to form a structure comprising a tool body having a tooling surface, the eutectic material being a metal alloy.

Clause 9. The method of clause 8, further comprising machining the tooling surface.

Clause 10. The method of clause 8 or 9, wherein the depositing of the eutectic material in i) and ii) comprises supplying a wire feed comprising the metal alloy and heating the wire feed to not more than 10° F. above the eutectic point of the metal alloy.

Clause 11. The method of any of clauses 8-10, wherein the freezing in i) and ii) comprises flowing an inert gas into contact with the eutectic material in liquid form until the temperature of the eutectic material is reduced to below the freezing point of the eutectic material.

Clause 12. The method of any of clauses 8-11, wherein the inert gas has a temperature ranging from about the eutectic point to about 50° F. below the eutectic point of the eutectic material.

Clause 13. The method of any of clauses 8-12, wherein the eutectic material comprises tin/zinc alloys, tin-lead alloys, tin-silver alloys, tin-lead-silver alloys, tin-copper-nickel-germanium alloys, bismuth-lead-indium-tin-cadmium alloys, indium-bismuth-tin alloys, bismuth-tin alloys, or combinations thereof.

Clause 14. The method of clauses 8-13, wherein the tool is a one-piece tool.

Clause 15. The method of any of claims 8-14, wherein the tooling surface comprises a smaller perimeter portion disposed between two larger perimeter portions.

Clause 16. A method of making a composite part, the method comprising: laying up a moldable composite material on a molding tool, the molding tool comprising a eutectic alloy having a melting temperature; heating the moldable composite material to a first temperature that is below the melting temperature of the eutectic alloy to form a green body; heating the green body to a second temperature to form a composite part, the second temperature being above the melting temperature of the eutectic alloy so as to melt the tool to form a liquid tool alloy; and removing at least a portion of the liquid tool alloy from the composite part.

Clause 17. The method of clause 16, wherein moldable composite material comprises a matrix material and fibers positioned in the matrix material.

Clause 18. The method of clause 16 or 17, wherein the fibers comprise a ceramic.

Clause 19. The method of any of clauses 16-18, wherein the matrix material comprises a ceramic.

Clause 20. The method of any of clauses 16-19, wherein the matrix material comprises a liquid component and a solid component.

Clause 21. The method of any of clauses 16-20, wherein the first temperature ranges from about 200° F. to a temperature below the eutectic point of the eutectic alloy.

Clause 22. The method of any of clauses 16-21, wherein solid component comprises a ceramic and the second temperature is a sintering temperature of the ceramic.

Clause 23. The method of any of clauses 16-22, wherein the sintering temperature ranges from about 1500° F. to about 3000° F.

Clause 24. The method of any of clauses 16-23, wherein the tooling surface has a three dimensional shape that prevents removal of the composite part in solid form.

Clause 25. The method of any of clauses 16-24, wherein the eutectic alloy comprises tin/zinc alloys, tin-lead alloys, tin-silver alloys, tin-lead-silver alloys, tin-copper-nickel-germanium alloys, bismuth-lead-indium-tin-cadmium alloys, indium-bismuth-tin alloys, bismuth-tin alloys or combinations thereof.

Clause 26. A composite part comprising a ceramic material, the composite part having an inner surface and an outer surface, the inner surface having at least trace amounts of a eutectic alloy disposed thereon.

Clause 27. The composite part of clause 26, wherein the ceramic material comprises pores, the eutectic alloy being disposed within at least some pores on the inner surface.

Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein.

While the present teachings have been illustrated with respect to one or more implementations, alterations and/or modifications can be made to the illustrated examples without departing from the spirit and scope of the appended claims. In addition, while a particular feature of the present teachings may have been disclosed with respect to only one of several implementations, such feature may be combined with one or more other features of the other implementations as may be desired and advantageous for any given or particular function. Furthermore, to the extent that the terms "including," "includes," "having," "has," "with," or variants thereof are used in either the detailed description and the claims, such terms are intended to be inclusive in a manner similar to the term "comprising." Further, in the discussion and claims herein, the term "about" indicates that the value listed may be somewhat altered, as long as the alteration does not result in nonconformance of the process or structure to the intended purpose described herein. Finally, "exemplary" indicates the description is used as an example, rather than implying that it is an ideal.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompasses by the following claims.

What is claimed is:

1. A molding tool, comprising:
   a tool body having a tooling surface for molding a part, the tool body comprising:
      a first layer of eutectic alloy, wherein the first layer of eutectic alloy comprises tin and zinc; and
      a second layer of eutectic alloy, the second layer comprising a eutectic alloy having a second melting temperature that is different than a first melting temperature of the first layer of eutectic alloy.

2. The molding tool of claim 1, wherein the tooling surface comprises a three dimensional shape that is capable of preventing removal of a molded composite part that does not enclose at least one side of the tool body.

3. The molding tool of claim 1, wherein the tooling surface comprises a fluted shape that is capable of preventing removal of a molded composite part that does not enclose at least one side of the tool body.

4. The molding tool of claim 1, wherein the tooling surface comprises a concave shape that is capable of preventing removal of a molded composite part that does not enclose at least one side of the tool body.

5. The molding tool of claim 1, wherein the tooling surface comprises a smaller perimeter portion disposed between two larger perimeter portions.

6. The molding tool of claim 1, wherein the eutectic alloy further comprises a tin-lead alloy, a tin-silver alloy, a tin-lead-silver alloy, a tin-copper-nickel-germanium alloy, a bismuth-lead-indium-tin-cadmium alloy, a indium-bismuth-tin alloy, a bismuth-tin alloy, or combinations thereof.

7. The molding tool of claim 1, wherein the tool is a one-piece tool.

8. A method of making a molding tool by additive manufacturing, the method comprising:
   i) forming a first layer of eutectic alloy, the forming comprising depositing the eutectic alloy in liquid form and then cooling to form a solid eutectic alloy;
   ii) forming an additional layer of the eutectic alloy on the first layer, the forming of the additional layer comprising depositing the eutectic alloy in liquid form and then cooling to form the solid eutectic alloy; and
   iii) repeating ii) one or more times to form a structure comprising a tool body having a tooling surface, the tool body comprising the eutectic alloy; and
      wherein the first layer of eutectic alloy comprises tin and zinc; and the additional layer comprises a eutectic alloy having a second melting temperature that is different than a first melting temperature of the first layer of eutectic alloy.

9. The method of claim 8, further comprising machining the tooling surface.

10. The method of claim 8, wherein the depositing of the eutectic alloy in i) and ii) comprises supplying a wire feed comprising a metal alloy formed of the metals of the eutectic alloy and heating the wire feed to not more than 10° F. above the eutectic point of the metal alloy.

11. The method of claim 8, wherein the cooling in i) and ii) comprises flowing an inert gas into contact with the eutectic alloy in liquid form until the temperature of the eutectic alloy is reduced to below the solidification point of the eutectic alloy.

12. The method of claim 11, wherein the inert gas has a temperature ranging from about the eutectic point to about 50° F. below the eutectic point of the eutectic alloy.

13. The method of claim 8, wherein the eutectic alloy further comprises one of tin-lead alloys, tin-silver alloys, tin-lead-silver alloys, tin-copper-nickel-germanium alloys, bismuth-lead-indium-tin-cadmium alloys, indium-bismuth-tin alloys, bismuth-tin alloys, and combinations thereof.

14. The method of claim 8, wherein the molding tool is a one-piece tool.

15. The method of claim 8, wherein the tooling surface comprises a smaller perimeter portion disposed between two larger perimeter portions.

16. A method of making a composite part, the method comprising:
   laying up a moldable composite material on a molding tool, the molding tool comprising a first layer of a eutectic alloy having a first melting temperature and a second layer of a eutectic alloy having a second melting temperature;
   heating the moldable composite material to a first temperature that is below the melting temperature of the eutectic alloy to form a green body;
   heating the green body to a second temperature to form a composite part, the second temperature being above the first and second melting temperatures of the eutectic alloy so as to melt the molding tool to form a liquid molding tool alloy; and
   removing at least a portion of the liquid molding tool alloy from the composite part; and
      wherein the first layer of eutectic alloy comprises tin and zinc.

17. The method of claim 16, wherein moldable composite material comprises a matrix material and fibers positioned in the matrix material.

18. The method of claim 17, wherein the fibers comprise a ceramic.

19. The method of claim 18, wherein the matrix material comprises a ceramic.

20. The method of claim 17, wherein the matrix material comprises a liquid component and a solid component.

21. The method of claim 20, wherein the first temperature ranges from about 200° F. to a temperature below the eutectic point of the eutectic alloy.

22. The method of claim 20, wherein solid component comprises a ceramic and the second temperature is a sintering temperature of the ceramic.

23. The method of claim 22, wherein the sintering temperature ranges from about 1500° F. to about 3000° F.

24. The method of claim 16, wherein the tooling surface comprises a three dimensional shape that prevents removal of the composite part in solid form.

25. The method of claim 16, wherein the eutectic alloy further comprises one of tin-lead alloys, tin-silver alloys, tin-lead-silver alloys, tin-copper-nickel-germanium alloys, bismuth-lead-indium-tin-cadmium alloys, indium-bismuth-tin alloys, bismuth-tin alloys, or combinations thereof.

26. The molding tool of claim 1, wherein the second layer of eutectic alloy comprises the same alloy as the first layer of eutectic alloy.

27. The molding tool of claim 1, wherein the second layer of eutectic alloy comprises a different eutectic alloy compared to the first layer of eutectic alloy.

* * * * *